US012684030B2

(12) United States Patent
Lo et al.

(10) Patent No.: US 12,684,030 B2
(45) Date of Patent: Jul. 14, 2026

(54) MULTIMEDIA SYSTEM WITH DYNAMIC ADAPTATION

(71) Applicant: MEDIATEK INC., Hsin-Chu (TW)

(72) Inventors: Ting-Sheng Lo, Hsinchu City (TW); Ming-Yuan Cheng, Hsinchu City (TW); Chia-Chun Hsu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 124 days.

(21) Appl. No.: 18/856,624

(22) PCT Filed: May 24, 2023

(86) PCT No.: PCT/CN2023/096021
§ 371 (c)(1),
(2) Date: Oct. 13, 2024

(87) PCT Pub. No.: WO2024/001621
PCT Pub. Date: Jan. 4, 2024

(65) Prior Publication Data
US 2025/0233905 A1 Jul. 17, 2025

Related U.S. Application Data

(60) Provisional application No. 63/355,696, filed on Jun. 27, 2022, provisional application No. 63/355,694, filed on Jun. 27, 2022.

(51) Int. Cl.
*H04L 65/80* (2022.01)
*H04L 65/75* (2022.01)

(52) U.S. Cl.
CPC ............ *H04L 65/80* (2013.01); *H04L 65/762* (2022.05)

(58) Field of Classification Search
CPC ..... H04L 65/80; H04L 65/762; H04L 65/612; H04L 65/613; H04L 65/752;
(Continued)

(56) References Cited

U.S. PATENT DOCUMENTS 8,443,398 B2 * 5/2013 Swenson ............ H04N 21/8545
725/54
9,264,749 B2 * 2/2016 Wolman ............... H04N 21/242
(Continued)

FOREIGN PATENT DOCUMENTS

| CN | 113287323 A | 8/2021 |
| EP | 1 280 310 A2 | 1/2003 |
| WO | 2021/026509 | 2/2021 |

OTHER PUBLICATIONS

"International Search Report" mailed on Aug. 22, 2023 for International application No. PCT/CN2023/096021, International filing date: May 24, 2023.
(Continued)

*Primary Examiner* — Oanh Duong
(74) *Attorney, Agent, or Firm* — Winston Hsu

(57) ABSTRACT

A multimedia system includes user equipment (UE) and a server. The user equipment includes a modem used to collect modem assistance information and transmit the modem assistance information, a media decoder used to decode compressed media to frames, and a frame renderer used to render the frames decoded by the media decoder. The server includes a frame generator used to generate the frames according to the modem assistance information, and a media encoder used to encode the frames to the compressed media according to the modem assistance information. The user equipment transmits the modem assistance information through a first UE port and receives the compressed media through a second UE port. The server receives the modem
(Continued)

assistance information through a first server port and transmits the compressed media to the user equipment through a second server port.

20 Claims, 3 Drawing Sheets

(58) Field of Classification Search
CPC ......... H04N 21/2662; H04N 21/44209; H04N 21/44245; H04N 21/4431; H04N 21/6373; H04N 21/6437
See application file for complete search history.

(56) References Cited

U.S. PATENT DOCUMENTS

| | | | | |
|---|---|---|---|---|
| 2013/0128947 | A1* | 5/2013 | Fryer | ................. H04N 21/2402 |
| | | | | 375/E7.026 |
| 2014/0173674 | A1 | 6/2014 | Wolman | |
| 2014/0281023 | A1 | 9/2014 | Apte | |
| 2014/0347376 | A1* | 11/2014 | Tateno | .................. H04L 65/762 |
| | | | | 709/219 |
| 2016/0037434 | A1 | 2/2016 | Gopal | |
| 2017/0111422 | A1* | 4/2017 | Parekh | ............. H04N 21/64792 |
| 2019/0349594 | A1 | 11/2019 | Cook | |
| 2020/0213371 | A1* | 7/2020 | Szucs | ................. H04N 21/4223 |
| 2021/0058630 | A1 | 2/2021 | Kopietz | |
| 2022/0174108 | A1 | 6/2022 | Oyman | |

OTHER PUBLICATIONS

Erik Dahlman et al., Chapter 13, Scheduling and Rate Adaptation, 4G: LTE/LTE-Advanced for Mobile Broadband, 2014, Elsevier, p. 321-346, XP093050297, 2014.

Anonymous, RMON, Wikipedia, The Wayback Machine, Dec. 4, 2021, https://web.archive.org/web/20220519220523/https://en.wikipedia.org/wiki/RMON, p. 1-3, XP093341763, Dec. 4, 2021.

* cited by examiner

MULTIMEDIA SYSTEM WITH DYNAMIC ADAPTATION

CROSS REFERENCE TO RELATED APPLICATION

This application claims the benefit of U.S. Provisional Application No. 63/355,694, filed on Jun. 27, 2022. Further, this application claims the benefit of U.S. Provisional Application No. 63/355,696, filed on Jun. 27, 2022. The contents of these applications are incorporated herein by reference.

FIELD OF THE INVENTION

The present invention relates to a multimedia system, and more particularly to a multimedia system with dynamic bitrate adaptation.

BACKGROUND OF THE INVENTION

Extended reality (XR) is an umbrella term that encompasses all the immersive technologies that create and enhance virtual environments. Extended reality includes virtual reality (VR), augmented reality (AR), mixed reality (MR), and other forms of digital simulations that blend the physical and digital worlds. XR can be used for various purposes, such as entertainment, education, training, health care, and social interaction. XR can also provide new ways of accessing information, expressing creativity, and collaborating with others across distances.

A XR server generally includes a storage unit, a processing unit, a network interface, and a software layer that manages the media files and their delivery. Typically, XR servers can support different protocols (e.g., HTTP, RTP, and RTSP) and formats for streaming media (e.g., HLS, MP4, MP3, and JPEG). They also can provide features like transcoding, encryption, authentication, caching, and load balancing to enhance the quality and security of the media streaming. More particularly, XR servers enable the creation and delivery of immersive and interactive experiences across different devices and platforms. They provide a unified interface for developers to access various XR features such as rendering, input, audio, networking, and spatial mapping. XR applications support different types of content such as 3D models, 360 videos, spatial audio, and interactive elements and they also can support cross-platform compatibility and scalability, allowing users to enjoy seamless and high-quality XR experiences on any device. Developers should be able to customize and optimize their XR applications according to their specific needs and preferences.

Network congestion is presently a great issue for XR applications. XR servers typically uses RTCP (Real-Time Transport Control Protocol) feedback to measure current network condition and compute congestion window and regulate how often it should send RTP (Real-Time Protocol) packets. RTCP works with RTP to monitor data delivery on large multicast networks. RTCP provides feedback on the quality of service (QOS) of RTP streams, such as packet loss, delay, jitter, and bandwidth usage. RTCP also synchronizes different media streams (e.g., audio and video) that are part of the same session. Nevertheless, RTCP feedback is periodic such that it does not update the current network condition quick enough for XR applications. Thus, the XR servers may not respond to variation in network condition in time and latency in streaming may be experienced by users.

SUMMARY OF THE INVENTION

An embodiment provides a multimedia system including user equipment (UE) and a server. The user equipment includes a modem, a media decoder and a frame renderer. The modem is used to collect modem assistance information and transmit the modem assistance information. The media decoder is used to decode compressed media to frames. The frame renderer is used to render the frames decoded by the media decoder. The server includes a frame generator and a media encoder. The frame generator is used to generate the frames according to the modem assistance information. The media encoder is used to encode the frames to the compressed media according to the modem assistance information. The user equipment transmits the modem assistance information through a first UE port and receives the compressed media through a second UE port. The server receives the modem assistance information through a first server port and transmits the compressed media to the user equipment through a second server port.

An embodiment provides a method of streaming in a multimedia system. The multimedia system includes user equipment (UE) and a server. The user equipment includes a modem, a media decoder and a frame renderer. The server includes a frame generator and a media encoder. The method includes collecting modem assistance information by the modem, transmitting the modem assistance information through a first UE port of the user equipment to the server through a first server port of the server, generating frames by the frame generator according to the modem assistance information, encoding the frames to compressed media according to the modem assistance information, transmitting the compressed media by the server through a second server port of the server to the user equipment through a second UE port of the user equipment, decoding the compressed media to the frames by the media decoder, and rendering the frames by the frame renderer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
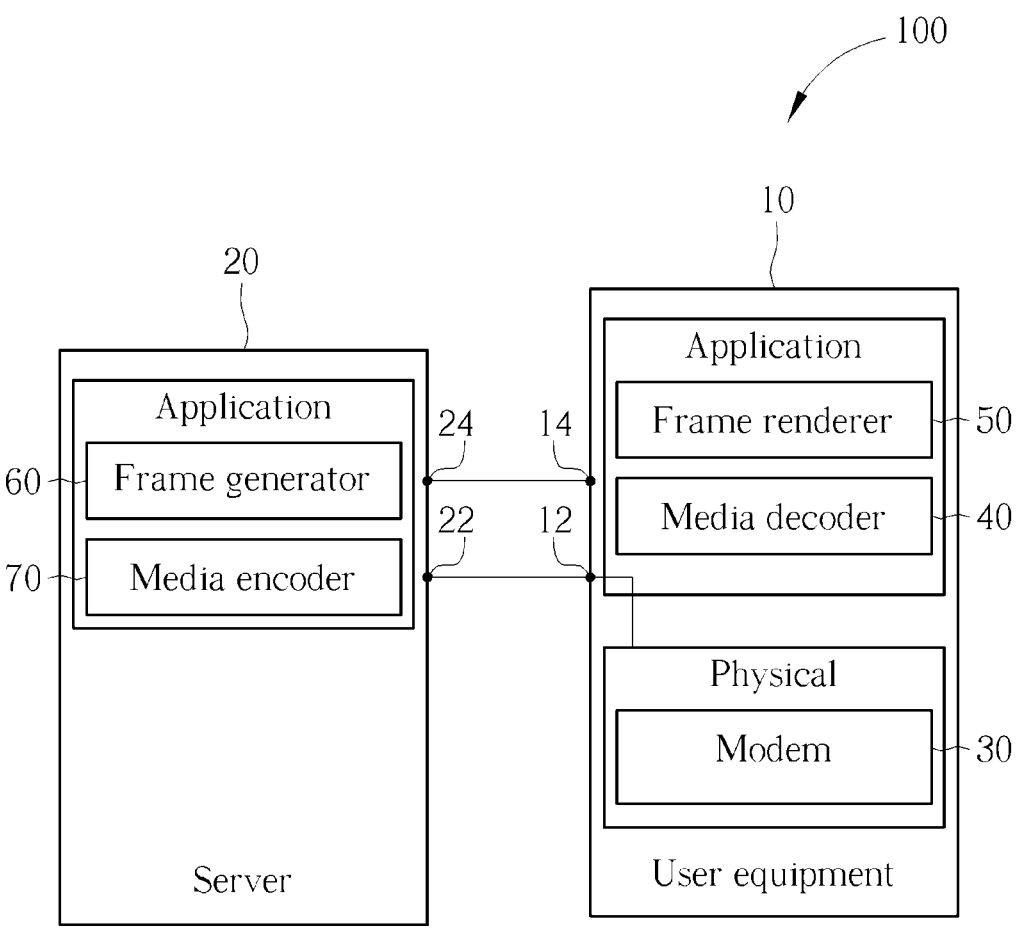
FIG. 1 is an illustration of a multimedia system of an embodiment of the present invention.

FIG. 1 is an illustration of a multimedia system 100 of an embodiment of the present invention. The multimedia system 100 includes user equipment (UE) 10 and a server 20. The user equipment 10 includes a modem 30, a media decoder 40 and a frame renderer 50. The modem 30 is used to collect modem assistance information and transmit the modem assistance information. The modem 30 is also responsible for connecting the user equipment 10 to the wireless network or the cellular network and enabling data communication. It typically has a baseband processor, a radio frequency (RF) transceiver, and an antenna. The media decoder 40 is used to decode compressed media to frames. The frame renderer 50 is used to render the frames decoded by the media decoder 40. Rendering makes the frames being displayed on the screen of the user equipment 10 at the appropriate time and position. The media decoder 40 and the frame renderer 50 can be either hardware or software modules. Therefore, the user equipment 10 may be commercial devices such as Oculus Quest, Microsoft HoloLens, HTC Vive Pro, Magic Leap One, Varjo XR, etc., that are able to immerse a user in the virtual environment and/or augments the user's surroundings.

The server 20 includes a frame generator 60 and a media encoder 70. The frame generator 60 is used to generate the frames according to the modem assistance information. The media encoder 70 is used to encode the frames to the compressed media according to the modem assistance information. The server 20 can be an XR server of any kind. The compressed media can be various standards and formats such as MPEG, H.264, HEVC, VP9 and AV1, etc. The frame generator 60 and the media encoder 70 can also be hardware or software modules according to the implementation.

The user equipment 10 transmits the modem assistance information through a first UE port 12 and receives the compressed media through a second UE port 14. The server 20 receives the modem assistance information through a first server port 22 and transmits the compressed media to the user equipment through a second server port 24.

Complying with the standard model, the frame generator 60, the media encoder 70, the first server port 24, the second server port 22, the frame renderer 50, the media decoder 40, the first UE port 12 and the second UE port 14 operate at the application layer, and the modem 30 operates at the physical layer. Thus, it is necessary for the modem assistance information to be transmitted to the first UE port 12 through cross-layer APIs (application programming interfaces), which are a type of API that allows communication between different layers (e.g., application layer and physical layer) of the multimedia system 100. Then, through the first UE port 12, the modem assistance information can be further transmitted to the first server port 22 such that the server 20 properly receives the modem assistance information.

The modem assistance information may include congestion information and handover event. The congestion information may include estimated data rate, downlink jitters, and/or uplink scheduling delay. The estimated data rate may be calculated from Reference Signal Received Power (RSRP) and/or Modulation and Coding Scheme (MCS). RSRP is the linear average of the received power of resource elements that carry cell-specific reference signals (CRS) over the entire bandwidth of a cell for measuring the strength of a signal from an individual cell in 5G cellular networks. MCS is used to determine the data rate of a wireless connection using high-throughput orthogonal frequency division multiplexing (HT-OFDM). The above are mere examples, and the present invention is not limited thereto.

Downlink jitters are fluctuations in the delay or latency of data packets transmitted from a base station to a device. Uplink scheduling is the process of allocating radio resources to devices which want to transmit data to the base station in a wireless network. The delay in uplink scheduling can be caused by the time data packet spent in layer 2 (data link layer) buffer.

In addition, a handover event often causes delay in communication. A handover event is a process in which cellular transmission (voice or data) is transferred from one base station (cell site) to another without losing connectivity to the cellular transmission. It describes a transfer of an ongoing call or data session from one channel connected to the core network to another channel. Delays often occur during the transfer.

Figure 2:
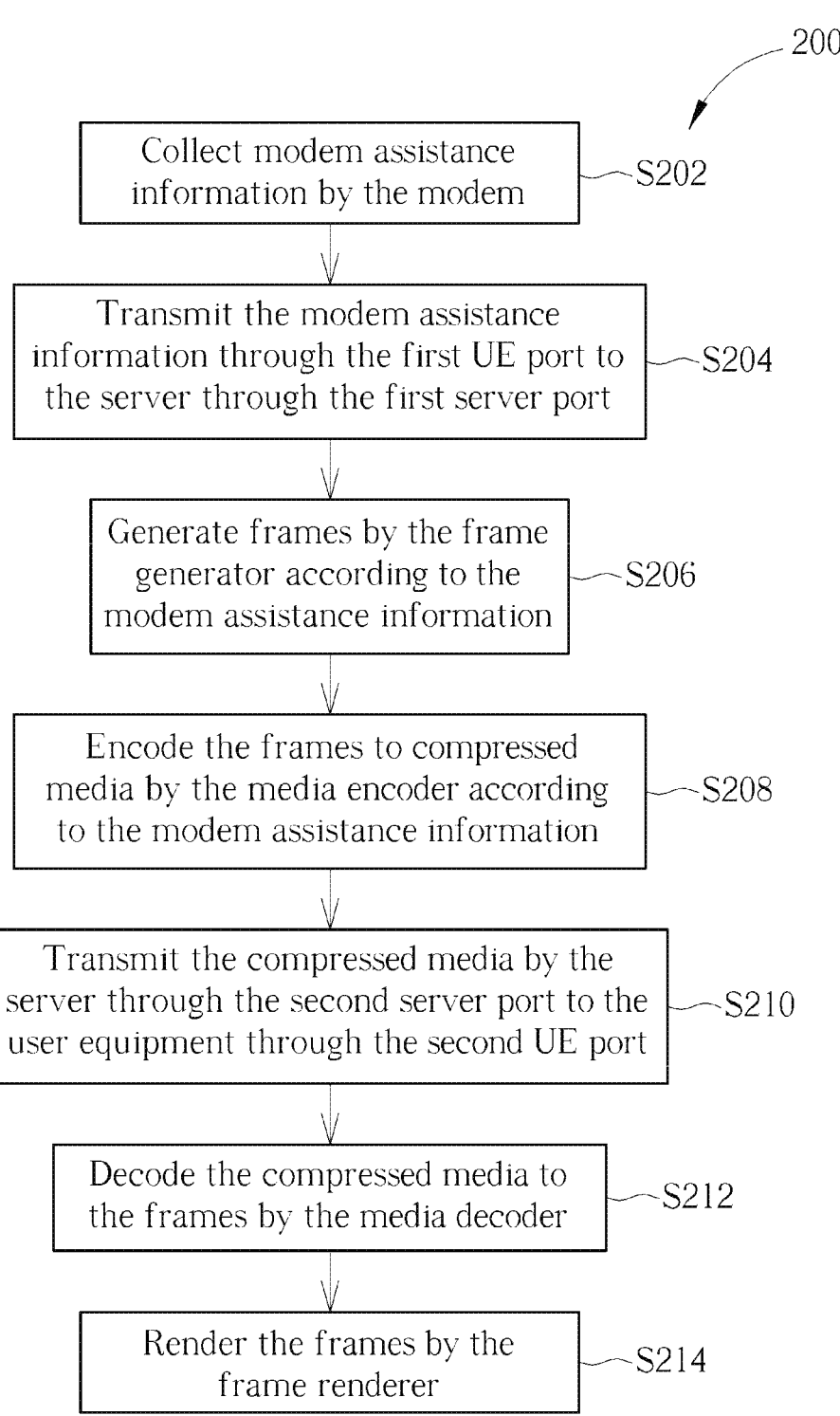
FIG. 2 is a flowchart of a method of streaming in the multimedia system of FIG. 1.

FIG. 2 is a flowchart of a method 200 of streaming in the multimedia system 100. The method 200 includes the following steps:

S202: Collect modem assistance information by the modem 30;

S204: Transmit the modem assistance information through the first UE port 12 of the user equipment 10 to the server 20 through the first server port 22;

S206: Generate frames by the frame generator 60 according to the modem assistance information;

S208 Encode the frames to compressed media by the media encoder 70 according to the modem assistance information;

S210: Transmit the compressed media by the server 20 through the second server port 24 to the user equipment 10 through the second UE port 14;

S212: Decode the compressed media to the frames by the media decoder 40; and S214: Render the frames by the frame renderer 50.

In step S202, the modem 30 can measure and compute congestion information such as estimated data rate, downlink jitters, and uplink scheduling delay. The modem 30 can collect congestion information by measuring the amount of data that can be transmitted over a communication channel in a given amount of time. The data rate of the modem 30 is affected by the modem physical layer and data link layer protocols. Moreover, the modem 30 can handle the handover event, in which cellular transmission is transferred from one base station to another without losing connectivity to the cellular transmission. In some embodiments, the modem 30 initiates a transmission of the modem assistance information when the computed estimated data rate drops more than 10%. In other embodiments, the modem 30 initiates a transmission of the modem assistance information when a downlink jitter is detected. The above are mere examples, and the present invention is not limited thereto.

In step S204, because the modem 30 operates at the physical layer and the communication between the user equipment 10 and the server 20 is established at the application layer, the modem assistance information collected is sent to the application layer through cross-layer APIs; then, the modem assistance information is transmitted through the first UE port 12 to the first server port 22 of the server 20. In some embodiments, the transmission of the modem assistance information between the server 20 and the user equipment 10 can be done using communication protocol such as WebSocket. In which case, the WebSocket is compatible to the HTTP (Hypertext Transfer Protocol) and the HTTP ports for WebSocket traffic are 80 and 443. However, the WebSocket can use any port, and ports 80 and 443 are most commonly used. These ports may correspond to the first UE port 12 and the first server port 22. In other embodiments, different HTTP/TCP ports may be used for the transmission of the modem assistance information.

In step S206, the frame generator 60 generates frames according to the modem assistance information. To generate a video frame from a given input, there are several steps involved. First, the input is preprocessed to extract relevant features and remove noise. Second, a model is trained or loaded to predict the next frame based on the input features. Third, the predicted frame is processed to enhance the quality and realism. Finally, the processed frame is appended to the output video and displayed or stored. This process can be repeated for multiple inputs to create a video sequence. Further, the frame generator 60 can implement rendering optimization according to the modem assistance information. Rendering optimization is the process of improving the performance and efficiency of rendering graphics on a screen. When the modem assistance information shows that congestion in the network occurs, the frame generator 60 can implement rendering optimization techniques, for example, foveated rendering, occlusion culling, level of detail (LOD), and frustum culling, deferred rendering, forward rendering, and mipmaps, etc. By applying these techniques, the multimedia system 100 can achieve higher frame rates, lower latency, smoother display, and better visual fidelity. Furthermore, it can also reduce bandwidth usage.

In steps S208 and S210, the generated frame sequence then can be encoded by the media encoder 70. Frame encoding involves applying compression algorithms to reduce the size and bandwidth of the frame data to compressed media, while maintaining acceptable quality and compatibility. Frame encoding can be done using various standards and formats, such as MPEG, H.264, HEVC, VP9 and AV1. Moreover, the media encoder 70 can apply bitrate adaptation, which is a technique that allows streaming media applications to adjust the quality of the transmitted data according to the available network bandwidth. Bitrate adaptation can improve the user experience by avoiding interruptions, buffering delays, and quality degradation caused by network fluctuations. Bitrate adaptation can reduce the network congestion and resource consumption by sending only the necessary amount of data. In practice, bitrate adaptation can be performed at different levels (e.g., the application layer, the transport layer, or the network layer) depending on the design and implementation of the multimedia system 100. The media encoder 70 can encode the frame sequence to the compressed media at multiple bit rates. When the modem assistance information shows that congestion in the network occurs, the server 20 can transmit the compressed media with less bit rates such that interruptions can be avoid, thus maintaining user experience. The second server port 24 and the second UE port 14 for media streaming may be HTTP port 443 or other suitable ports. The port number can be any suitable port number, and the common port numbers are in the range between 1024 and 65535. The invention is not limited thereto.

In step S212, after the user equipment 10 receives the compressed media, the media decoder 40 can then convert the compressed media into frame sequence that can be displayed. Decoding involves several steps including parsing the bitstream, decoding headers and parameters, reconstructing the prediction and transform domains, applying inverse quantization and inverse transform, performing motion compensation and deblocking filtering, and outputting the decoded frames.

In step S214, the frame renderer 50 can render the decoded frames by creating and displaying frames at the appropriate time and position on the screen of the user equipment 10. In some embodiments in which user equipment 10 is a VR headset, rendering may involve steps like tracking the user's head position and orientation, computing the projection matrices for each eye, rendering the scene from two different viewpoints, applying distortion correction and chromatic aberration correction, and displaying the frame on the headset. VR frame rendering can be challenging because it requires high performance and low latency to ensure a smooth and immersive experience for the user. In some embodiments, asynchronous timewarp (ATW), which adjusts the rendered frames based on the latest head pose before displaying them, can be applied to the above-mentioned challenge.

Figure 3:
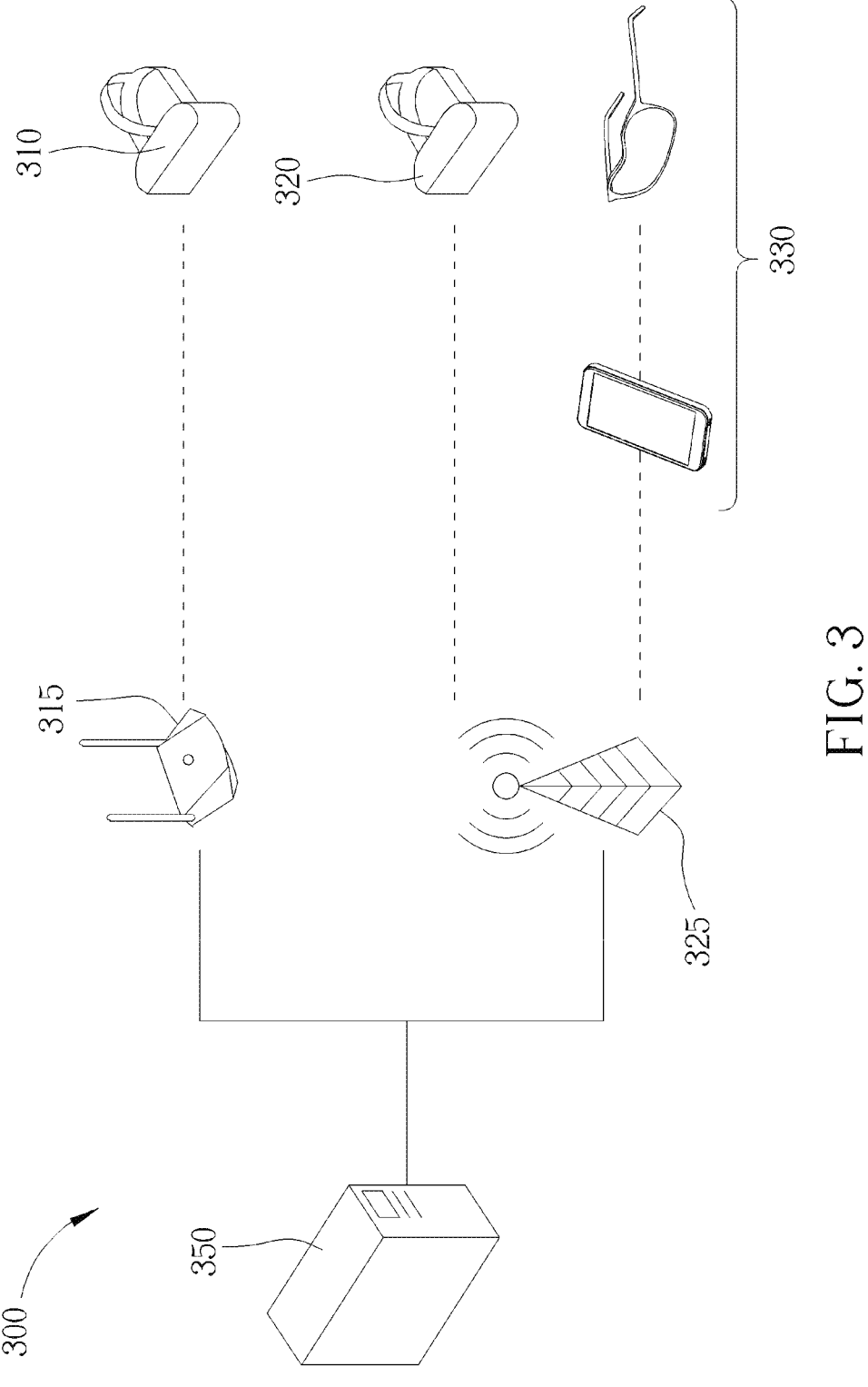
FIG. 3 is an illustration of a multimedia system of another embodiment.

FIG. 3 is an illustration of a multimedia system 300 of an embodiment. The multimedia system 300 is a practical implementation of the multimedia system 100. In the embodiment, the user equipment 310-330 may be XR headsets or XR glasses. The user equipment 310 may connect to an XR server 350 through a fixed network via a Wi-Fi access point 315. The user equipment 320 may connected to the XR server 350 directly through a 5G cellular network via a base station (cell site) 325. The user equipment 330 (i.e., the VR glasses coupled to the cellphone) may connect to the server 350 through a 5G cellular network via the base station 325. In each case, the modem assistance information can be collected and transmitted to the XR server 350 for use in rendering optimization and bitrate adaptation in real time. Thus, it minimizes the negative impact of network congestion on the user experience.

Reference has been made in detail to implementations, examples of which are illustrated in the accompanying drawings. In the detailed description above, numerous specific details have been set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first device could be termed a second device, and, similarly, a second device could be termed a first device, without departing from the scope of the various described implementations. The first device and the second device are both types of devices, but they are not the same device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multimedia system comprising:
user equipment (UE) comprising:
    a modem configured to collect modem assistance information and transmit the modem assistance information;
    a media decoder configured to decode compressed media to frames; and
    a frame renderer configured to render the frames decoded by the media decoder; and
a server comprising:
    a frame generator configured to generate the frames according to the modem assistance information; and
    a media encoder configured to encode the frames to the compressed media according to the modem assistance information;
wherein:
    the user equipment transmits the modem assistance information through a first UE port and receives the compressed media through a second UE port; and
    the server receives the modem assistance information through a first server port and transmits the compressed media to the user equipment through a second server port.

2. The multimedia system of claim 1, wherein the frame generator, the media encoder, the first server port and the second server port operate at an application layer.

3. The multimedia system of claim 2, wherein the frame renderer, the media decoder, the first UE port and the second UE port operate at the application layer.

4. The multimedia system of claim 3, wherein the modem operates at a physical layer.

5. The multimedia system of claim 1, wherein the modem assistance information is transmitted by the modem through cross-layer APIs (application programming interfaces) to the first UE port, and the first UE port transmits the modem assistance information to the first server port.

6. The multimedia system of claim 1, wherein the modem assistance information comprises congestion information and handover events.

7. The multimedia system of claim 6, wherein the congestion information comprises an estimated data rate, downlink jitters, and/or an uplink scheduling delay.

8. The multimedia system of claim 7, wherein the modem initiates a transmission of the modem assistance information when the estimated data rate drops more than 10%.

9. The multimedia system of claim 1, wherein when the media encoder implements bitrate adaptation according to the modem assistance information.

10. The multimedia system of claim 1, wherein the frame generator implements rendering optimization according to the modem assistance information.

11. A method of streaming in a multimedia system, the multimedia system comprising user equipment (UE) and a server, the user equipment comprising a modem, a media decoder and a frame renderer, the server comprising a frame generator and a media encoder, the method comprising:
    collecting modem assistance information by the modem;
    transmitting the modem assistance information through a first UE port of the user equipment to the server through a first server port of the server;
    generating frames by the frame generator according to the modem assistance information;
    encoding the frames to compressed media by the media encoder according to the modem assistance information;
    transmitting the compressed media by the server through a second server port of the server to the user equipment through a second UE port of the user equipment;
    decoding the compressed media to the frames by the media decoder; and
    rendering the frames by the frame renderer.

12. The method of claim 11, wherein the frame generator, the media encoder, the first server port and the second server port operate at an application layer.

13. The method of claim 12, wherein the frame renderer, the media decoder, the first UE port and the second UE port operate at the application layer.

14. The method of claim 13, wherein the modem operate at a physical layer.

15. The method of claim 11, wherein the modem assistance information is transmitted from the modem through cross-layer APIs (application programming interfaces) to the first UE port, and the first UE port transmits the modem assistance information to the first server port.

16. The method of claim 11, wherein the modem assistance information comprises congestion information and handover events.

17. The method of claim 16, wherein the congestion information comprises an estimated data rate, downlink jitters, an uplink and/or scheduling delay.

18. The method of claim 17, wherein the modem initiates a transmission of the modem assistance information when the estimated data rate drops more than 10%.

19. The method of claim 11, wherein when the media encoder implements bitrate adaptation according to the modem assistance information.

20. The method of claim 11, wherein the frame generator implements rendering optimization according to the modem assistance information.

* * * * *